United States Patent Office 3,703,554
Patented Nov. 21, 1972

3,703,554
TERPENYLAMINO ETHERS AND THIOETHERS
Carl Bordenca, Ponte Vedra Beach, Fla., assignor to SCM Corporation, Cleveland, Ohio
No Drawing. Filed July 22, 1969, Ser. No. 851,770
Int. Cl. C07c 87/24, 93/10
U.S. Cl. 260—583 EE
10 Claims

ABSTRACT OF THE DISCLOSURE

Described are a novel class of diamines of the formula:

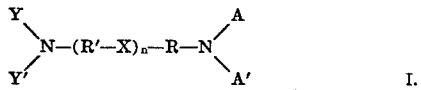

where Y and Y' are terpenyl, R' and R are lower allylene, A and A' are like or dissimilar lower alkyl, X is sulfur or oxygen, and $n$ is an integer of from 1 to 3. Also described are stable salts thereof.

Novel compounds and compositions containing them are advantageous in that they exhibit phytocidal activity when employed in minute quantities and are nontoxic to warm-blooded animals and man. Compounds and compositions are phytocidally effective against aquatic and terrestrial plant species and are often effective against aquatic weeds in concentrations below 1 part per million.

The present invention relates to a novel class of phytocidal compounds, compositions containing them, and to processes for controlling undesirable plant growth.

The terms "phytocidal compound" or "phytocidal composition" as used herein are intended to mean and to refer to compounds or compositions which kill and/or prevent the growth of plant life in areas where the growth of plants is undesirable or detrimental.

Preparation capable of killing and/or preventing terrestrial plant growth are generally valuable in controlling the growth of vegetation in and around rights-of-way such as long-line telephone or high tension wires, railroads, highways, and the like. Preparations which are capable of killing or preventing the growth of aquatic weeds are valuable when used in lakes and ponds infested with aquatic weeds such as elodea, naiad, algae, and the like. Among the foregoing preparations are selective phytocides, that is, compounds which selectively kill certain plant species while having little or no effect on others. Other preparations include phytocides which generally kill terrestrial plant species but have little or no effect on aquatic weeds. Many such known preparations are disadvantageous in that they are injurious to warm-blooded animals and humans, the injury being effected by contact with plants which have been treated or through contact with other animals such as fish which have accumulated residues of the phytotoxic materials through rain run-off into lakes which they inhabit.

Compounds and compositions falling within the scope of the present invention are advantageous in that they are phytocidally effective against terrestrial and aquatic plants in concentrations which are well below those which would ordinarily kill or adversely affect warm-blooded animals and human beings.

In one of its aspects, the invention provides a novel class of compounds of the formula:

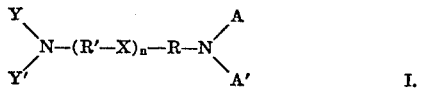

where Y and Y' are terpenyl, R' and R are lower alkylene, A and A' are like or dissimilar lower alkyl, X is sulfur or oxygen, and $n$ is an integer of from 1 to 3 and hydrohalide salts theerof.

Compounds falling within the scope of the above formula and compositions containing them will effectively prevent the growth of undesirable plant life when such compounds are contacted with the plant or its environment. Compounds and compositions containing them have been fed to a broad spectrum of animals in concentrations and amounts well above the phytocidally effective amount without exhibiting adverse effects in the animals to which they have been fed.

Compounds and compositions containing the compounds have also been applied in amounts well above those phytocidally effective to the skin of human beings and laboratory animals without significant harmful effects. Standard laboratory evaluation tests have shown that the preponderance of compounds falling within the scope of Formula I are not hazardous skin irritants. The compounds when orally administered to standard laboratory test animals such as rats and mice in amounts equivalent to 2000 times greater than the phytocidally effective amounts produce no illness or death in the animals.

Compounds falling within the scope of the above formula have limited water solubility but are soluble in solvents conventionally used in the pesticidal art. However, compounds falling within the scope of the above formula can be readily made water soluble by converting them into the corresponding stable ammonium salts (or tertiary amine salts) by reacting them with an appropriate acid such as, for example, hydrochloric, hydrobromic, sulfuric, phosphoric acids, etc. to form the corresponding hydrochloride, hydrobromide, acid sulphate, acid phosphate, and the like, salts. Such salts are readily soluble in water and can be applied to plants and soils or water containing plants and in terrestrial and aquatic areas infested with weed pests in the form of an aqueous solution.

Preferred salts are hydrohalide salts, for example hydrochloride and hydrobromide salts since these have been found to be particularly active against terrestrial and aquatic pest weeds. Actually such salts are among the most economic species of salts falling within the scope of the above formula.

In the above formula, Y and Y' are like or dissimilar terpenyl and are preferably like terpenyl for economic reasons. Y and Y' can represent any terpenyl radical including acyclic, monocyclic, and bicyclic terpenyl radicals and can also represent sesquiterpenyl radicals. Such sesquiterpenyl radicals can be acyclic, monocyclic, bicyclic or tricyclic.

Acyclic terpenyl groups which can be represented by Y and/or Y' which fall within the scope of Formula I include for example, citronellyl, bupleuryl, geranyl, neryl, lavandulyl, linalyl, and myrcenyl. Advantageous and preferred phytocidal compounds falling within the scope of Formula I are those wherein Y and/or Y' represents geranyl and linalyl.

Monocyclic terpenyls which can be represented by Y and/or Y' in Formula I include menthyl, tetrahydrocarvyl, alphaterpinyl, beta-terpinyl, and gamma-terpinyl, the terpeninyls, dihydrocarvyl, piperityl, isopulegyl, carvyl and the like. Compounds where Y and/or Y' represents carvyl and isopulegyl have been found to be particularly advantageous phytocidal agents.

Bicyclic terpenyl groups represented by Y and/or Y' include nopyl, sabinyl, thujyl, verbenyl, pinocarvyl, the santenyls, bornyl, isobornyl, fenchyl, isofenchyl, etc. Of the foregoing compounds, those where Y and/or Y' represents camphanyl, verbenyl, pinocarvyl and bornyl have been found to be especially effective phytocidal agents.

Sesquiterpenyl groups represented by Y and/or Y' in Formula I can include acyclic sesquiterpenyl such as farnesyl and nerolidyl; monocyclic sesquiterpenyl include bisabolyl and zingiberyl; bicyclic terpenyls include cadinyl, carophyllenyl and selinyl; and tricyclic sesquiterpenyl include cedryl and santalyl. Compounds in which Y and/or Y' are sesquiterpenyl which have been found to be advantageous are those where Y and/or Y' is farnesyl.

In Formula I above, R and R' are lower alkylene groups containing between 1 and 6 carbon atoms and can be like or dissimilar but are preferably ethylene, propylene, and butylene. A and A' in the formula are lower alkyl and can be like or dissimilar but are preferably like and are most preferably methyl or ethyl for economic reasons.

One advantageous class of phytocidally effective compounds falling within the scope of Formula 1 is represented by the formula:

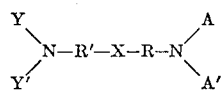

II.

where Y and Y', R and R', X, A and A' are previously described. Also advantageous are the afore-defined salts of the above class of compounds.

Specific compounds falling within the scope of Formula II which have been found to be particularly effective phytocides are:

N,N-diethylaminoethyl 2-(di-geranyl amino)-ethyl ether;
N,N-diethylaminoethyl 2-(di-geranyl amino)-ethyl thioether;
N,N-diethylaminoethyl 2-(di-linalyl amino)-ethyl ether;
N,N-diethylaminoethyl 2-(di-linalyl amino)-ethyl thioether;
N,N-diethylaminoethyl 2-(di-carvyl amino)-ethyl ether;
N,N-diethylaminoethyl 2-(di-carvyl amino)-ethyl thioether;
N,N-diethylaminoethyl 2-(di-terpinyl amino)-ethyl ether;
N,N-diethylaminoethyl 2-(di-terpinyl amino)-ethyl thioether;
N,N-diethylaminoethyl 2-(di-verbenyl amino)-ethyl ether;
N,N-diethylaminoethyl 2-(di-verbenyl amino)-ethyl thioether;
N,N-diethylaminoethyl 2-(di-pinocarvyl amino)-ethyl ether;
N,N-diethylaminoethyl 2-(di-pinocarvyl amino)-ethyl thioether;
N,N-diethylaminoethyl 2-(di-farnesyl amino)-ethyl ether;
N,N-diethylaminoethyl 2-(di-farnesyl amino)-ethyl thioether;
N,N-diethylaminoethyl 2-(di-geranyl amino)-2-propyl ether;
N,N-diethylaminoethyl 2-(di-geranyl amino)-2-propyl thioether;
N,N-diethylaminoethyl 3-(di-geranyl amino)-propyl ether;
N,N-diethylaminoethyl 3-(di-geranyl amino)-propyl thioether;
N,N-diethylaminoethyl 4-(di-geranyl amino)-butyl ether;
N,N-diethylaminoethyl 4-(di-geranyl amino)-butyl thioether;
N,N-diethylaminoethyl 3-(di-geranyl amino)-2-methylpropyl ether;
N,N-diethylaminoethyl 3-(di-geranyl amino)-2-methylpropyl thioether.

N,N-dimethylaminoethyl and N,N-diethylaminopropyl analogs of the foregoing diterpenylaminoalkyl ethers are also effective phytocidal agents.

Another advantageous class of phytocidally effective compounds falling within the scope of Formula I is represented by the formula:

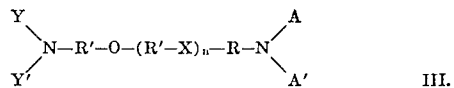

III.

where Y, Y', R, R', A, A', X and n are as hereinbefore described. Also advantageous are the afore-defined salts of the above compounds.

Specific compounds falling within the scope of Formula III which have been found to be particularly effective phytocides are:

N,N-diethylaminoethoxyethyl 2-(di-geranylamino)-ethyl ether;
N,N-diethylaminoethylthioethyl 2-(di-geranylamino)-ethyl ether;
N,N-diethylaminoethoxyethyl 2-(di-linalylamino)-ethyl ether;
N,N-diethylaminoethylthioethyl-2-(di-linalylamino)-ethyl ether;
N,N-diethylaminoethoxyethyl 2-(di-carvylamino)-ethyl ether;
N,N-diethylaminoethylthioethyl 2-(di-carvylamino)-ethyl ether;
N,N-diethylaminoethoxyethyl 2-(di-terpinylamino)-ethyl ether;
N,N-diethylaminoethylthioethyl 2-(di-terpinylamino)-ethyl ether;
N,N-diethylaminoethoxyethyl 2-(di-verbenylamino)-ethyl ether;
N,N-diethylaminoethylthioethyl 2-(di-verbenylamino)-ethyl ether;
N,N-diethylaminoethoxyethyl 2-di-pinocarvylamino)-ethyl ether;
N,N-diethylaminoethylthioethyl 2-(di-pinocarvylamino)-ethyl ether;
N,N-diethylaminoethoxyethyl 2-(di-farnesylamino)-ethyl ether;
N,N-diethylaminoethylthioethyl 2-(di-farnesylamino)-ethyl ether;
N,N-diethylaminoethoxyethyl 2-(di-geranylamino)-2-propyl ether;
N,N-diethylaminoethylthioethyl 2-(di-geranylamino)-2-propyl ether;
N,N-diethylaminoethoxyethyl 3-(di-geranylamino)-propyl ether;
N,N-diethylaminoethylthioethyl 3-(di-geranylamino)-propyl ether;
N,N-diethylaminoethoxyethyl 4-(di-geranylamino)-butyl ether;
N,N-diethylaminoethylthioethyl 4-(di-geranylamino)-butyl ether;
N,N-diethylaminoethoxyethyl 3-(di-geranylamino)-2-methylpropyl ether;
N,N-diethylaminoethylthioethyl-3-(di-geranylamino)-methylpropyl ether.

In the above Formulae, I, II, and III, R' is a lower alkylene group containing 1–8 carbon atoms; R is also a lower alkylene but is preferably ethylene, and A and A' are like or dissimilar lower alkyl groups. The groups represented by R', R and A can contain from 1–8 carbon atoms but preferably contain from 2–6 carbon atoms since compounds in which the lower alkylene and lower alkyl groups containing 7 or 8 carbon atoms often tend to have a low dispersibility in liquids in which they are employed. Although R and R' can be methylene, ethylene, propylene, or butylene, and A and A' can be methyl, ethyl, propyl, or butyl, particularly advantageous compounds are those where R represents ethylene and A and A' represent ethyl.

Compounds falling within the scope of all the above formulae are water insoluble and are generally soluble in conventional organic solvents employed in phytocidal formulations. Compounds are usually liquid, have general properties of oils and boil between 100–170° C., the boiling points being measured at a pressure of 1 millimeter of mercury. However, stable water soluble salts of the compounds hereinbefore referred to can be directly dissolved in water for end use application.

The phytocidal compounds of this invention are usually employed in conjunction with a carrier or diluent or a mixture of conventional carriers or diluents and when in such form will be hereinafter referred to as phytocidal compositions. The amount of a compound falling within the scope of the Formula I which is employed in the phytocidal compositions of the present invention can vary widely between about 0.1 and about 90 weight percent, depending upon the intended end use. Usually the compositions will contain between 0.1 and about 10 weight percent of one or more of the compounds hereinbefore described, the compound or compounds being usually in intimate mixture with the carrier or diluent.

When it is desired to use a phytocidal composition directly, that is, without further dilution, the amount of phytocidal compound will usually vary from between about 0.1 and about 0.5 weight percent. When it is desired to formulate a concentrated phytocidal composition, that is, one suitable for dilution prior to end use, the phytocidal compounds are usually present in the composition in an amount of from about 0.5 to about 90 weight percent. From a practical standpoint, compositions containing from 0.5 to 10 weight percent of a phytocidal compound can be advantageously employed for general end use dilution. The carrier or diluent employed can be any carrier conventionally used in phytocidal formulations with the proviso that the carrier should be inert, that is, it should be incapable of undergoing a chemical reaction with the phytocidal compound. The carrier should also be nontoxic to animal wildlife. The carrier or diluent can be any one of a variety of organic and inorganic, liquid, solid or semi-solid carriers or carrier formulations conventionally used in herbicidal products and can also be a mixture of such diluents or carriers. Examples of organic liquid carriers include liquid aliphatic hydrocarbons, for example, pentane, hexane, heptane, nonane, decane, and their analogs as well as liquid aromatic hydrocarbons. Examples of other liquid hydrocarbons which are widely used for economic reasons include oils produced by the distillation of coal and the distillation of various types and grades of petrochemical stocks. Petroleum oils which are especially useful and economical include kerosene oils (e.g., oils composed of hydrocarbon mixtures of low molecular weight and which have from 10 to 16 carbon atoms), which are obtained by fractional distillation of petroleum at between 360° F. and 510° F. and which usually have a flash point between 150° F. and 185° F. Other petroleum oils include those generally referred to in the art as agricultural spray oils which are light and medium spray oils consisting of the middle fractions in the distillation of petroleum, and have a viscosity in the range of from 40–85 sec. Saybolt at 100° F. and are only slightly volatile. These oils are usually highly refined and contain only minute amounts of unsaturated compounds as measured by standard sulfonation tests. The customary sulfonation range of such oils is between 90 percent and 94 percent of unsulfonatable residue. These oils are paraffin oils and can be emulsified with water and an emulsifier and diluted to lower concentrations and used as sprays. Tall oils obtained from sulfate digestion of wood pulp, like paraffin oils, can also be employed.

In addition to the above-mentioned liquid hydrocarbons and often employed in conjunction therewith, the carrier can contain conventional emulsifying agents (e.g., a non-ionic surfactant such as an ethylene oxide condensate of octyl phenol or an anionic surfactant such as an alkali metal salt of an alkylbenzenesulfonic acid). Such emulsifiers are used to permit the composition to be dispersed in and diluted with water for end use applications.

When paraffin oils are employed as carriers in the phytocidal compositions of this invention, they are usually used in conjunction with an emulsifier, the mixture being diluted with water immediately prior to end use application. Other suitable paraffin oils, particularly those used with emulsions, are referred to in the art as heavy paraffin oils and usually have a viscosity greater than 85 sec. Saybolt at 100° F.

Other advantageous organic liquid carriers can include liquid terpene hydrocarbons and terpene alcohols (e.g., alphapinene, dipentene, terpineol, and the like). Still other liquid carriers include organic solvents such as aliphatic and aromatic alcohols, esters, aldehydes, and ketones. Aliphatic monohydric alcohols include methyl, ethyl, n-propyl, isopropl, n-butyl, sec-butyl and t-butyl alcohols. Suitable dihydric alcohols include glycols such as ethylene and propylene glycol and the pinacols (alcohols having the empirical formula $C_6H_{12}(OH)_2$). Suitable polyhydroxyl alcohols include glycerol, arabitol, erythritol, sorbitol and the like. Suitable cyclic alcohols include cyclopentyl and cyclohexyl alcohols.

Conventional aromatic and aliphatic esters, aldehydes and ketones can be employed and usually used in combination with the above-mentioned alcohols. Still other liquid carriers including high-boiling petroleum products such as mineral oil and higher alcohols (sometimes referred to as "liquid waxes") such as cetyl alcohol, can also be employed.

Solid carriers which can be used in the compositions of this invention include finely divided inorganic solid materials. Suitable finely divided solid inorganic carriers include siliceous minerals such as clays (e.g., bentonite, attapulgite, fuller's earth, diatomaceous earth, kaolin, mica, talc, and finely divided quartz, etc.) as well as synthetically prepared siliceous materials such as silica aerogels and precipitated and fume silicas.

Examples of finely divided solid organic materials include starch, flour, sugar, sawdust, casein, gelatin, and the like.

Examples of semi-solid carriers include petroleum jelly, lanolin and the like, and mixtures of liquid and solid carriers which provide semi-solid carrier products.

The above-described compositions can be employed per se or can be diluted with suitable liquids or solids and when applied to undesirable plant growth such as, for example, terrestrial and aquatic pest weeds and cause the death of such pest weeds within a relatively short period of time, usually less than one week. Compositions when used to contact soil in which pest weed seeds are germinating but in which pest weeds have not emerged, will in many instances prevent the emergence and growth of the pest weeds. The compositions or compounds are usually contacted with the plant or in the case of aquatic plants with the environment of the plants in concentrations as low as one part per million in certain instances and will effectively kill plants within a relatively short time.

Compounds falling within the scope of this invention can be prepared in a number of ways such as, for example, by reacting a dialkylaminoalkyl halide with a diterpenyl amine in the presence of an alkali metal hydroxide and heating the mixture at elevated temperatures for several hours. The mixture is diluted with an approximately equal volume of water to dissolve precipitated solids. The resulting mixture consists of an aqueous phase and an oil phase which separate upon standing. The oil phase consists essentially of the dialkylaminoalkyl ethers of diterpenyl amines. Alternatively the compounds can be prepared using an alkali metal carbonate in place of the alkali metal hydroxide.

In another embodiment, a terpenyl halide is first reacted with an alkanol amine to yield an N,N-diterpenyl alkanol amine. One mol of the diterpenyl alkanol amine is reacted with 1.5 mols of dialkylaminoalkyl hydrohalide in a 50% aqueous solution in the presence of 5 mols sodium hydroxide in a 40% aqueous solution thereof. The resulting mixture is heated with agitation over a 3 to 4 hour period while maintaining the temperature of the reaction mixture at between 70 and 95° C. Thereafter, the mixture is cooled and permitted to separate into an oily layer consisting of N,N-dialkylaminoalkyl 2-(di-terpenylamino)-alkyl ether and an aqueous layer consisting essentially of water and an alkali metal halide. Other advantageous process embodiments which can be employed in the preparation of the compounds of this invention will be readily apparent to those skilled in the art.

The following are some typical examples of the physical properties of substantially water insoluble phytocidal compounds falling within the scope of this invention:

|  | $n_D^{25}$ | Specific gravity |
|---|---|---|
| N,N-diethylaminoethyl 2-(di-geranylamino)-ethyl ether | 1.4863 | 0.864 |
| N,N-diethylaminoethyl 2-(di-geranylamino)-propyl ether | 1.4856 | 0.880 |
| N,N-diethylaminoethyl 2-(di-geranylamino)-1-propyl ether | 1.4856 | 0.882 |
| N,N-diethylaminoethyl 2-(di-geranylamino)-butyl ether | 1.4858 | 0.887 |
| N,N-diethylaminoethyl 2-(di-geranylamino)-1-propyl ether | 1.4882 | 0.888 |

Stable salts (hereinbefore defined) of the above compounds are water soluble.

The following specific examples are intended to illustrate the invention but not to limit the scope thereof, parts and percentages being by weight unless otherwise specified.

EXAMPLE 1

Nine glass vessels having a capacity of one gallon each and containing submersed naiad aquatic weeds were divided into three equal groups. Into the first group of vessels, there was added N,N-diethylaminoethyl 2-(di-geranylamino)-ethyl ether in an amount sufficient to provide a concentration of 1 weight part per million weight parts of water of the compound in each of the first set of three vessels.

Into the second set of vessels, the same compound was added in an amount sufficient to provide a concentration of 2.5 parts of compound per million parts of water.

In the third set of vessels, there was added an amount of the compound sufficient to provide a concentration of 5 parts of compound per million parts of water. The naiad weeds in the vessels were examined at two week intervals for six weeks and rated on a scale of from 0 to 100, 0 being the score when no effect was noted on the naiad weeds and 100 representing a complete kill of the pest weeds. At the end of two weeks, substantially all of the naiad plants in the vessels containing 5 parts per million were killed. All plants were dead in four weeks.

A separate vessel containing naiad plants which had not been exposed to the compound grew normally.

EXAMPLE 2

The procedure of Example 1 was repeated except that fresh jars were used and the pest aquatic weed, elodea, was used in place of the naiad plants employed in Example 1. At the end of four weeks, all of the plants that had been exposed to all concentrations of the compound were dead.

EXAMPLE 3

The procedures of Examples 1 and 2 were repeated except that the dihydrochloride salt of N,N-diethylaminoethyl 2-(di-geranylamino)-ethyl ether was employed in place of the compound in those examples. The results obtained in each instance were substantially identical to the results obtained in the Examples 1 and 2.

EXAMPLE 4

The procedures of Examples 1 and 2 were repeated except that N,N-diethylaminoethyl 2-(di-geranylamino)-ethyl thioether was employed in place of the compound employed in Example 1. Substantially the same results were obtained as those obtained in Examples 1 and 2.

EXAMPLE 5

The procedures of Examples 1 and 2 were repeated except that N,N-diethylaminoethyl 2-(di-geranylamino)-2-propyl ether was employed in place of the phytocidal compound employed in Example 1. Substantially the same results were obtained as those obtained in Examples 1 and 2.

EXAMPLE 6

The procedures of Examples 1 and 2 were repeated except that N,N-diethylaminoethyl 2-(di-carvylamino)-ethyl ether was employed in place of the phytocidal compound employed in Examples 1 and 2. Substantially the same results were obtained as were obtained in those examples, that is, both the naiad and the elodea pest weeds were killed within four weeks.

EXAMPLE 7

The procedures of Example 1 were repeated except that N,N-diethylaminoethyl (di-isobornylamino)-ethyl ether was employed in place of the compound employed in Examples 1 and 2. All pest weeds were killed within four weeks.

EXAMPLE 8

The procedures of Examples 1 and 2 were repeated except that N,N-diethylaminoethyl 2-(di-farnesylamino)-ethyl ether was employed in place of the phytocidal compound employed in Examples 1 and 2. The results were substantially identical to the results of Example 1.

EXAMPLE 9

The procedures of Examples 1 and 2 were repeated except that N,N-diethylaminoethoxyethyl 2-(di-geranylamino)-ethyl ether was employed in place of the compound employed in Examples 1 and 2.

EXAMPLE 10

The procedures of Examples 1 and 2 were repeated except that N,N-diethylaminoethylthioethyl 2-(di-terpinylamino)-ethyl ether was employed in place of the compound employed in Examples 1 and 2. The results were substantially identical to those obtained in Example 1.

EXAMPLE 11

The procedures of Examples 1 and 2 were repeated except that N,N-diethylaminoethoxyethyl 2-(di-geranylamino)-butyl ether was employed in place of the compound employed in Examples 1 and 2. The results were substantially identical to those obtained in Example 1.

EXAMPLE 12

Five separate dispersions consisting of 0.35% by weight, respectively, of N,N-diethylaminoethyl 2-(di-carvylamino)-ethyl thioether, N,N-diethylaminoethyl 2-(di-verbenylamino)-ethyl ether, N,N-diethylaminoethyl 2-(di-pinocarvylamino)-ethyl ether, N,N-diethylaminoethoxyethyl 2-(di-linalylamino)-ethyl ether, N,N-diethylaminoethoxyethyl 2-(di-terpinylamino)-ethyl ether, 1% by weight of para-isooctylpolyethoxyethylene phenol (a non-ionic surfactant), 5% by weight of acetone, the balance consisting substantially of water, were prepared. Seven groups of four Mexican bean plants, four garden pea plants, and four lima bean plants were contacted with 5 milliliters, respectively, of one of the five above-described dispersions. Contact was effected by spraying the plants from a distance of one foot using a conventional spraying device. The total quantity of the compounds sprayed on each plant was 17.5 milligrams. Replicate plants were untreated and served as controls. All of the compounds were phytotoxic to all the plants treated as evidenced by leaf curling, mottled appearance of the leaves, and local leaf necrosis which appeared within seven days. The plants were all dead within 14 days demonstrating the phytocidal effect of the compounds on the plants. Untreated control plants were unaffected and continued growing.

What is claimed is:

1. N,N-di(alkyl)aminoethyl N',N'-di(terpenyl)aminoalkyl ether or thioether and stable salts thereof wherein said alkyl groups are lower alkyl and said terpenyl groups are like acyclic terpenyl.

2. N,N-di(alkyl)aminoethyl N',N'-di(geranyl)aminoalkyl ether or thioether and stable salts thereof wherein said alkyl groups are lower alkyl.

3. N,N-di(alkyl)aminoethyl N',N'-di(linalyl)aminoalkyl ether or thioether and stable salts thereof wherein said alkyl groups are lower alkyl.

4. N,N-di(alkyl)aminoethyl N',N'-di(terpenyl)aminoalkyl ether or thioether and stable salts thereof wherein said alkyl groups are lower alkyl and said terpenyl groups are like sesquiterpenyl.

5. N,N-di(alkyl)-aminoethyl N',N'-di(farnesyl)aminoalkyl ether or thioether and stable salts thereof wherein said alkyl groups are lower alkyl.

6. N,N - di(alkyl)aminoalkylene - [oxyalkyl, thioalkyl, oxyalkyleneoxyalkyl, oxyalkylenethioalkyl, thioalkyleneoxyalkyl or thioalkylenethioalkyl] N',N' - di(terpenyl)-aminoalkyl ether and stable salts thereof wherein said alkyl and alkylene groups are lower alkyl and alkylene, and said terpenyl groups are like acyclic terpenyl.

7. N,N - di(alkyl)aminoalkylene - [oxyalkyl, thioalkyl, oxyalkyleneoxyalkyl, oxyalkylenethioalkyl, thioalkyleneoxyalkyl or thioalkylenethioalkyl] N',N' - di(geranyl)-aminoalkyl ether and stable salts thereof wherein said alkyl and alkylene groups are lower alkyl and alkylene.

8. N,N - di(alkyl)aminoalkylene - [oxyalkyl, thioalkyl, oxyalkyleneoxyalkyl, oxyalkylenethioalkyl, thioalkyleneoxyalkyl or thioalkylenethioalkyl] N',N'-di(linalyl)aminoalkyl ether and stable salts thereof wherein said alkyl and alkylene groups are lower alkyl and alkylene.

9. N,N-(alkyl)aminoalkylene-[oxyalkyl, thioalkyl, oxyalkyleneoxyalkyl, oxyalkylenethioalkyl, thioalkyleneoxyalkll or thioalkylenethioalkyl] N',N'-di(terpenyl)aminoalkyl ether and stable salts thereof wherein said alkyl and alkylene groups are lower alkyl and alkylene and said terpenyl groups are like sesquiterpenyl.

10. N,N - di(alkyl)aminoalkylene-[oxyalkyl, thioalkyl, oxyalkyleneoxyalkyl, oxyalkylenethioalkyl, thioalkyleneoxyalkyl or thioalkylenethioalkyl] N',N'-di(farnesyl)-aminoalkyl ether and stable salts thereof wherein said alkyl and alkylene groups are lower alkyl and alkylene.

References Cited
UNITED STATES PATENTS

| | | | |
|---|---|---|---|
| 3,206,511 | 9/1965 | Bindler et al. | 260—584 B X |
| 3,472,845 | 10/1969 | Thiele | 260—584 C X |

LEWIS GOTTS, Primary Examiner

R. L. RAYMOND, Assistant Examiner

U.S. Cl. X.R.

71—66, 69, 98, 121; 260—563 R, 584 B, 584 C